US009860815B2

United States Patent
Yi et al.

(10) Patent No.: US 9,860,815 B2
(45) Date of Patent: Jan. 2, 2018

(54) METHOD AND APPARATUS FOR CARRYING OUT COOPERATIVE CELL CLUSTERING-BASED COOPERATIVE COMMUNICATION AND HANDOVER

(71) Applicants: LG Electronics Inc., Seoul (KR); KOREA ADVANCED INSTITUTE OF SCIENCE AND TECHNOLOGY, Daejoen (KR)

(72) Inventors: Yunjung Yi, Seoul (KR); Hansung Leem, Daejeon (KR); Dan Keun Sung, Daejeon (KR); JaYeong Kim, Daejeon (KR); Byounghoon Kim, Seoul (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/317,092

(22) PCT Filed: Jun. 8, 2015

(86) PCT No.: PCT/KR2015/005736
§ 371 (c)(1),
(2) Date: Dec. 7, 2016

(87) PCT Pub. No.: WO2015/190785
PCT Pub. Date: Dec. 17, 2015

(65) Prior Publication Data
US 2017/0142630 A1    May 18, 2017

Related U.S. Application Data

(60) Provisional application No. 62/009,310, filed on Jun. 8, 2014.

(51) Int. Cl.
*H04W 36/00* (2009.01)
*H04W 36/30* (2009.01)
(Continued)

(52) U.S. Cl.
CPC .......... *H04W 36/30* (2013.01); *H04W 36/04* (2013.01); *H04W 36/08* (2013.01); *H04W 36/34* (2013.01)

(58) Field of Classification Search
None
See application file for complete search history.

(56) References Cited

U.S. PATENT DOCUMENTS

2007/0135125 A1*  6/2007  Kim .................... H04B 1/7105
                                                   455/436
2010/0056149 A1*  3/2010  Jubin ................ H04W 36/0094
                                                   455/436
(Continued)

FOREIGN PATENT DOCUMENTS

KR    1020100100578 A    9/2010
WO    2013140244 A1      9/2013
WO    2013160795 A1     10/2013

OTHER PUBLICATIONS

3rd Generation Partnership Project, "Technical Specification Group Radio Access Network; Evolved Universal Terrestrial Radio Access (E-UTRA); User Equipment (UE) procedures in idle mode (Release 8)", 3GPP TS 36.304 V8.5.0, Mar. 2009, 30 pages.
(Continued)

*Primary Examiner* — Idowu O Osifade
(74) *Attorney, Agent, or Firm* — Lee Hong Degerman Kang Waimey

(57) ABSTRACT

The present specification suggests a method for improving performance degradation caused by frequent handovers when a terminal moves among several cells, particularly among dense small cells. To this end, required are cooperative transmission among cells and a new handover method. A base station receives RSRP information about an anchor cell and a neighboring cell and configures a cooperation-based cell cluster using the RSRP information. If RSRP values are compared and meet specific conditions, the
(Continued)

anchor cell and the neighboring cell carry out cooperative communication. If the RSRP values of the anchor cell and an anchor candidate cell are compared during the cooperative communication and meet specific conditions, handover from the anchor cell to the anchor candidate cell is carried out. If the present invention is applied, when the terminal moves in an environment where small cells are dense, the number of handovers is greatly reduced and thus network burden can be lessened.

9 Claims, 23 Drawing Sheets

(51) Int. Cl.
  *H04W 36/08* (2009.01)
  *H04W 36/34* (2009.01)
  *H04W 36/04* (2009.01)

(56) References Cited

U.S. PATENT DOCUMENTS

2010/0085941 A1\* 4/2010 Chin ................ H04W 36/0094
                                                    370/332
2010/0273514 A1  10/2010 Koo et al.
2013/0157712 A1   6/2013 Park et al.

OTHER PUBLICATIONS

PCT International Application No. PCT/KR2015/005736, International Search Report dated Sep. 7, 2015, 2 page.

\* cited by examiner

METHOD AND APPARATUS FOR CARRYING OUT COOPERATIVE CELL CLUSTERING-BASED COOPERATIVE COMMUNICATION AND HANDOVER

CROSS-REFERENCE TO RELATED APPLICATIONS

This application is the National Stage filing under 35 U.S.C. 371 of International Application No. PCT/KR2015/005736, filed on Jun. 8, 2015, which claims the benefit of U.S. Provisional Application No. 62/009,310, filed on Jun. 8, 2014, the contents of which are all hereby incorporated by reference herein in their entirety.

BACKGROUND OF THE INVENTION

Field of the Invention

The present invention relates to mobile communication and, more particularly, to a technique for cooperative transmission and handover in a mobile communication system.

Related Art

Since a user equipment (UE) as a representative mobile device has mobility, the UE may experience deterioration in the quality of a service currently provided and may discover a cell providing better services. Thus, the UE may move to a new cell, which is called a handover of the UE.

A microcell, femtocell, and picocell having small service coverage may be installed in a specific location within the coverage of a macrocell having wide coverage. Such cells may be referred to as small cells.

A heterogeneous network (HetNet) refers to a network in which diverse types of cells overlap to be managed simultaneously in the same area. As it becomes difficult to meet a growing demand for data from UEs with only one existing macrocell in recent times, an HeNet topology and small-cell dense structure are suggested to serve a local area using a low-output microcell, femtocell, picocell, radio repeater, or the like, thereby increasing overall network capacity and improving energy efficiency. With small and dense cells, an inter-cell cooperative transmission technique and a technique for processing a frequent handover of a UE with mobility receive attention.

SUMMARY OF THE INVENTION

A technical aspect of the present invention proposes a method and an apparatus for improving performance degradation including increasing overhead in the handover of a core network caused by a frequent handover when a UE moves among several cells, particularly among dense small cells.

First, proposed are a method and an apparatus that perform a cooperative transmission with a neighboring cell, instead of performing a handover, when a UE moves from a currently serving anchor cell to the neighboring cell, and perform a handover from the anchor cell to an anchor cell candidate only when the UE further moves to satisfy specific handover requirements, thereby reducing the number of handovers.

In addition, proposed is a method for a UE to decode control signal information on an anchor cell in order to perform the handover suggested in the present invention.

According to one embodiment, there is provided a method performing a handover by an anchor base station (BS) in a mobile communication system comprising a plurality of cells. The method includes: receiving information on signal strength of an anchor cell, signal strength of a neighboring cell, and signal strength of an anchor cell candidate, which are measured by a UE; configuring a cooperation-based cell cluster using the information; performing cooperative communication between the anchor cell and a supporting neighboring cell using the cooperation-based cell cluster; and performing a handover from the anchor cell to the anchor cell candidate when the signal strength of the anchor cell candidate is a sum of the signal strength of the anchor cell and a handover threshold or greater.

The cooperative communication may be performed when the signal strength of the anchor cell is a sum of the signal strength of the neighboring cell and a cooperation threshold or less.

The cooperation-based cell cluster may include information on the anchor cell and information on the supporting neighboring cell.

When the handover from the anchor cell to the anchor cell candidate is performed and the signal strength of the anchor cell candidate is a sum of signal strength of the supporting neighboring cell and a cooperation threshold or greater, the anchor cell candidate may release the cooperative communication with the supporting neighboring cell.

When the handover from the anchor cell to the anchor cell candidate is not performed and signal strength of the neighboring cell is a sum of the signal strength of the supporting neighboring cell and a substitute threshold or greater, the cell performing the cooperative communication with the anchor cell may be changed to the neighboring cell.

The anchor cell may allocate a UE-specific common resource.

According to another embodiment, there is provided an apparatus for performing a handover in a mobile communication system including a plurality of cells. The apparatus includes a memory; a transceiver; and a processor to connect the memory and the transceiver, wherein the processor controls the transceiver to receive information on signal strength of an anchor cell, signal strength of a neighboring cell, and signal strength of an anchor cell candidate, which are measured by a UE, configures a cooperation-based cell cluster using the information, performs cooperative communication between the anchor cell and a supporting neighboring cell using the cooperation-based cell cluster, and performs a handover from the anchor cell to the anchor cell candidate when the signal strength of the anchor cell candidate is a sum of the signal strength of the anchor cell and a handover threshold or greater.

The cooperative communication may be performed when the signal strength of the anchor cell is a sum of the signal strength of the neighboring cell and a cooperation threshold or less.

When the handover from the anchor cell to the anchor cell candidate is performed and the signal strength of the anchor cell candidate is a sum of signal strength of the supporting neighboring cell and a cooperation threshold or greater, the anchor cell candidate may release the cooperative communication with the supporting neighboring cell.

According to still another embodiment, there is provided a method of decoding control signal information for a handover by a UE in cooperative communication between base stations BSs in a mobile communication system in which a plurality of cells is densely disposed. The method includes: measuring signal strength of a neighboring cell; and decoding control signal information and data information on the neighboring cell when the signal strength of the neighboring cell is a decoding threshold or greater. The control signal information on the neighboring cell may include information for performing a handover to an anchor cell to an anchor cell candidate.

According to the present invention, the number of handovers occurring when a UE with mobility is served in an environment of a small-cell dense structure may be considerably reduced. Therefore, overhead in signaling for a handover to a core network may be remarkably reduced to decrease the burden of the network.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
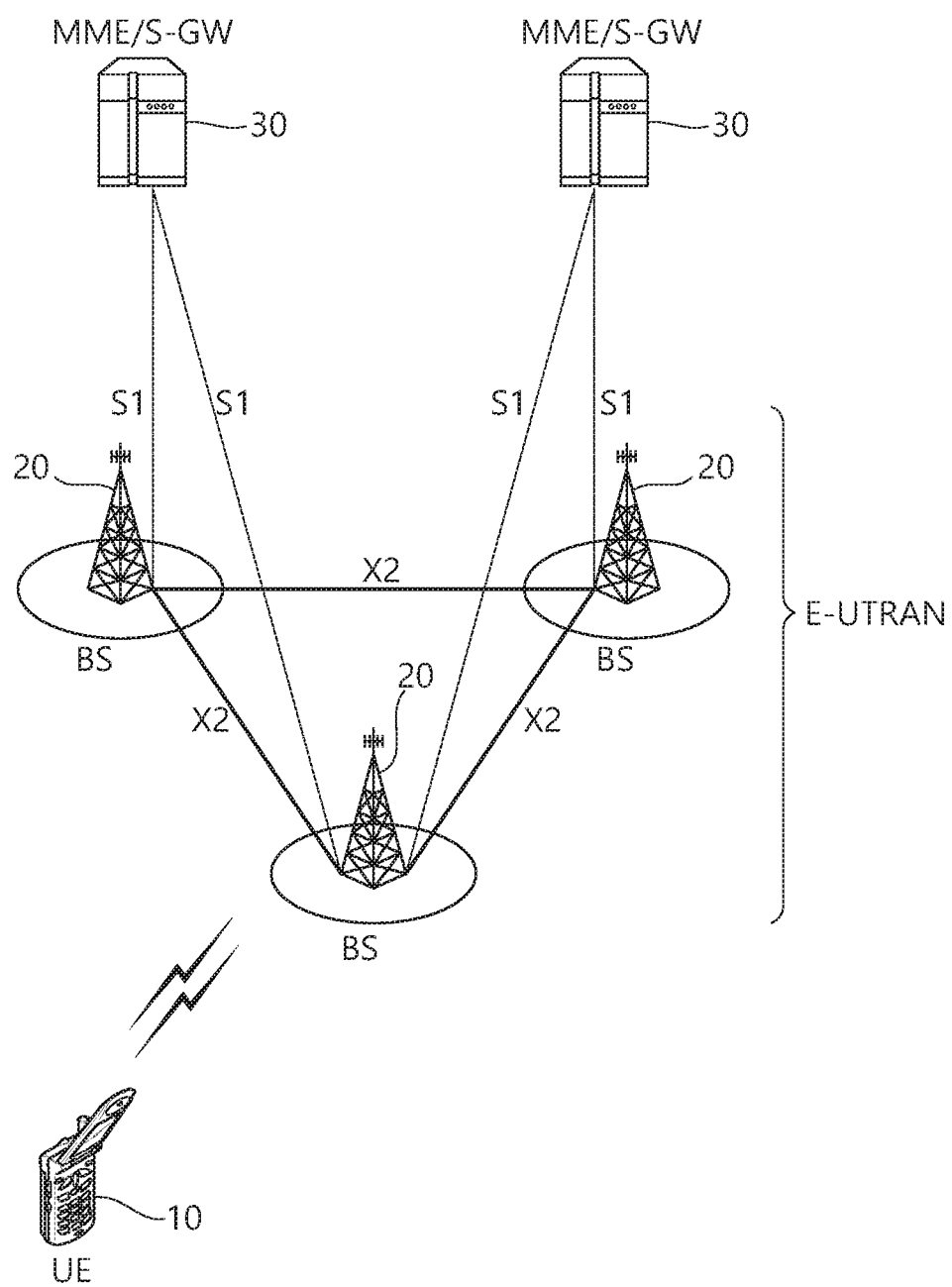
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
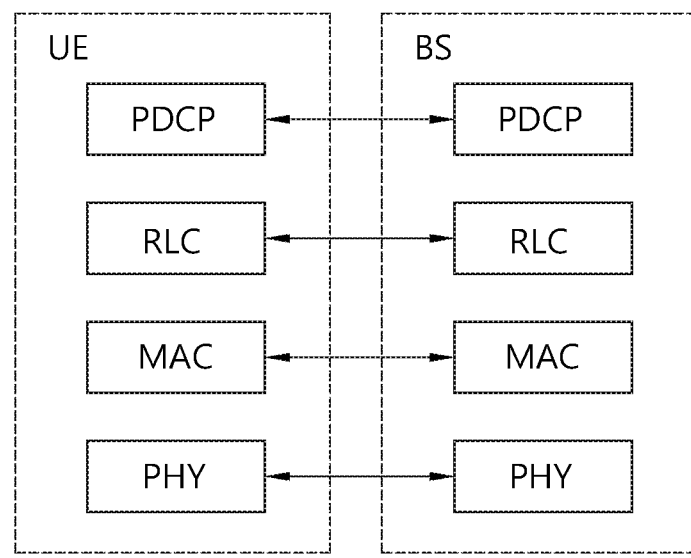
FIG. 2 is a block diagram illustrating a radio protocol architecture for a user plane.
Figure 3:
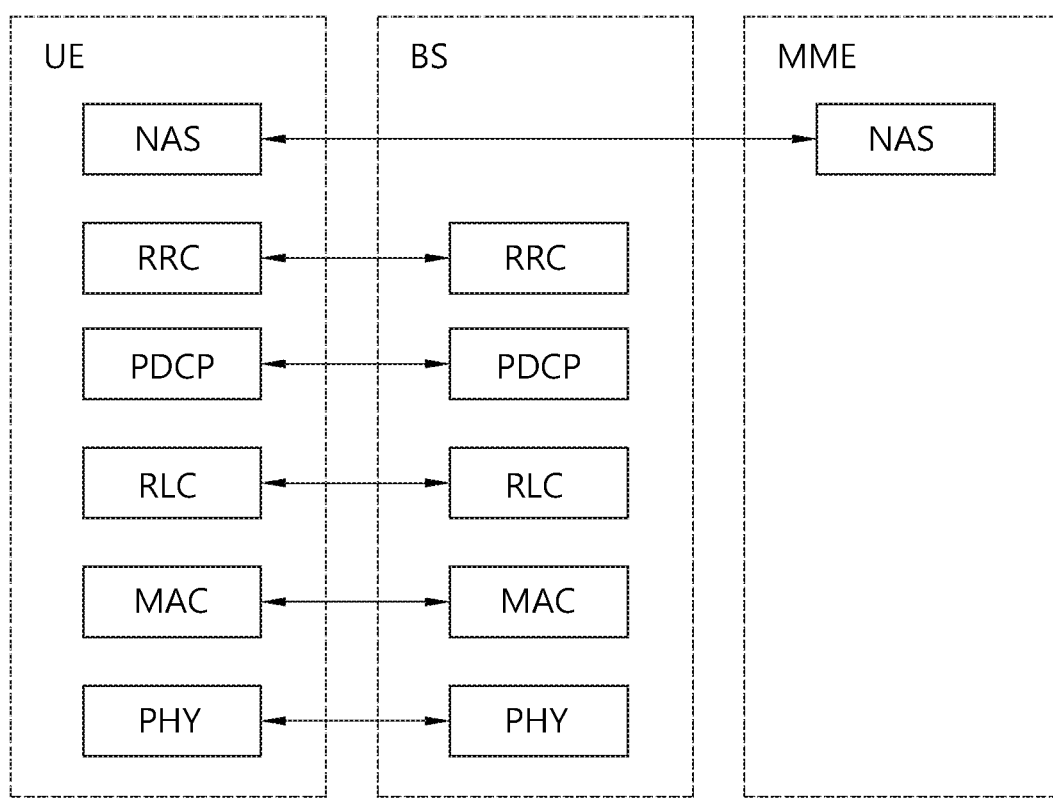
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Figure 4:
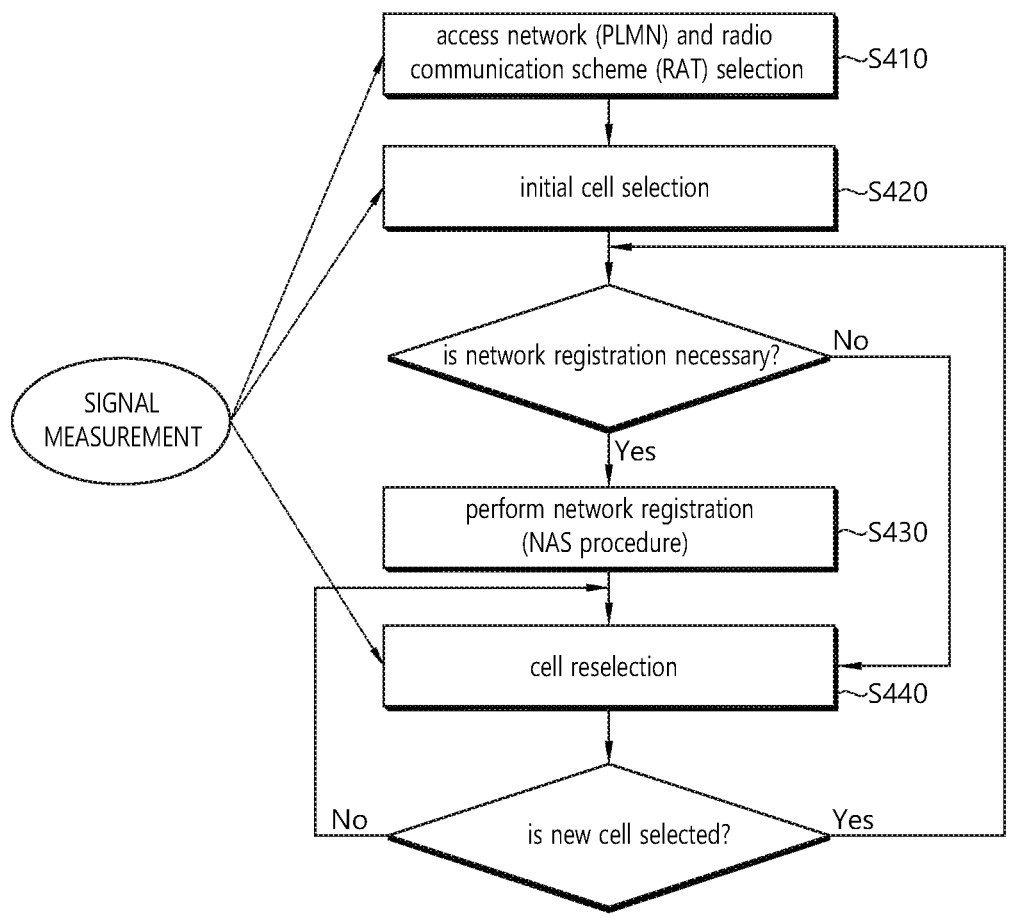
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary. Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
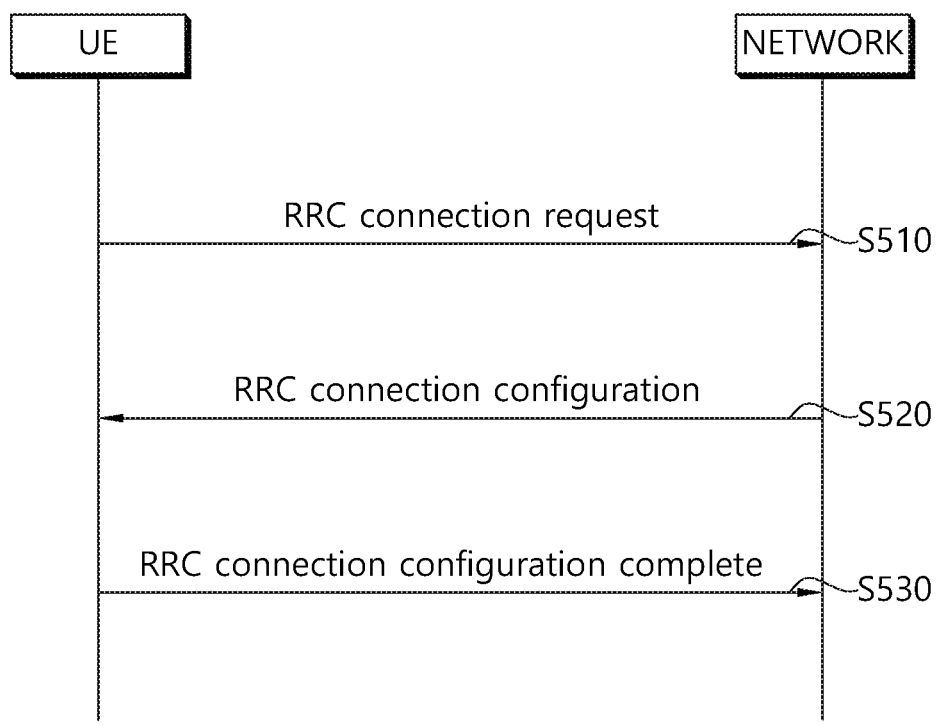
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
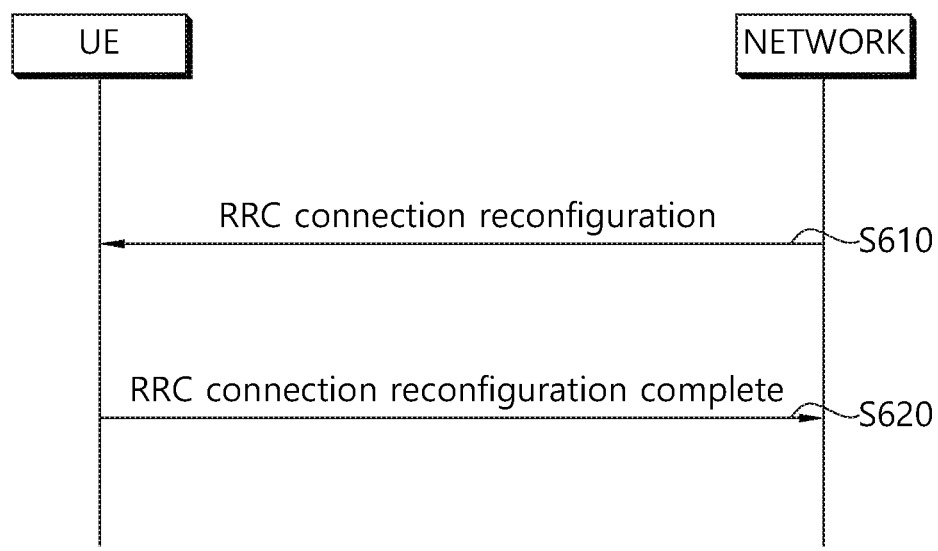
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, R_n = Q_{meas,n} - Q_{offset}$$ [Equation 1]

Here, Rs represents a ranking criterion of the serving cell, Rn represents a ranking criterion of the neighbor cell, Qmeas,s represents a quality value measured with respect to the serving cell by the UE, Qmeas,n represents a quality value measured with respect to the neighbor cell by the UE, Qhyst represents a hysteresis value for ranking, and Qoffset represents an offset between the both cells.

In the intra-frequency, when the UE receives the offset Qoffsets,n between the serving cell and the neighbor cell, Qoffset=Qoffsets,n, and when the UE does not receive Qoffsets,n, Qoffset=0.

In the inter-frequency, when the UE receives the offset Qoffsets,n for the corresponding cell, Qoffset=Qoffsets,n+Qfrequency, and when the UE does not receive Qoffsets,n, Qoffset=Qfrequency.

When the ranking criterion Rs of the serving cell and the ranking criterion Rn of the neighbor cell are changed in a similar state, the ranking order is frequently reversed as the changing result, and as a result, the UE may alternately reselect the two cells. Qhyst is a parameter for preventing the UE from alternately reselecting the two cells by giving the hysteresis in the cell reselection.

The UE measures the Rs of the serving cell and the Rn of the neighbor cell according to the Equation 1, regards the cell having the largest ranking criterion value as the highest ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Figure 7:
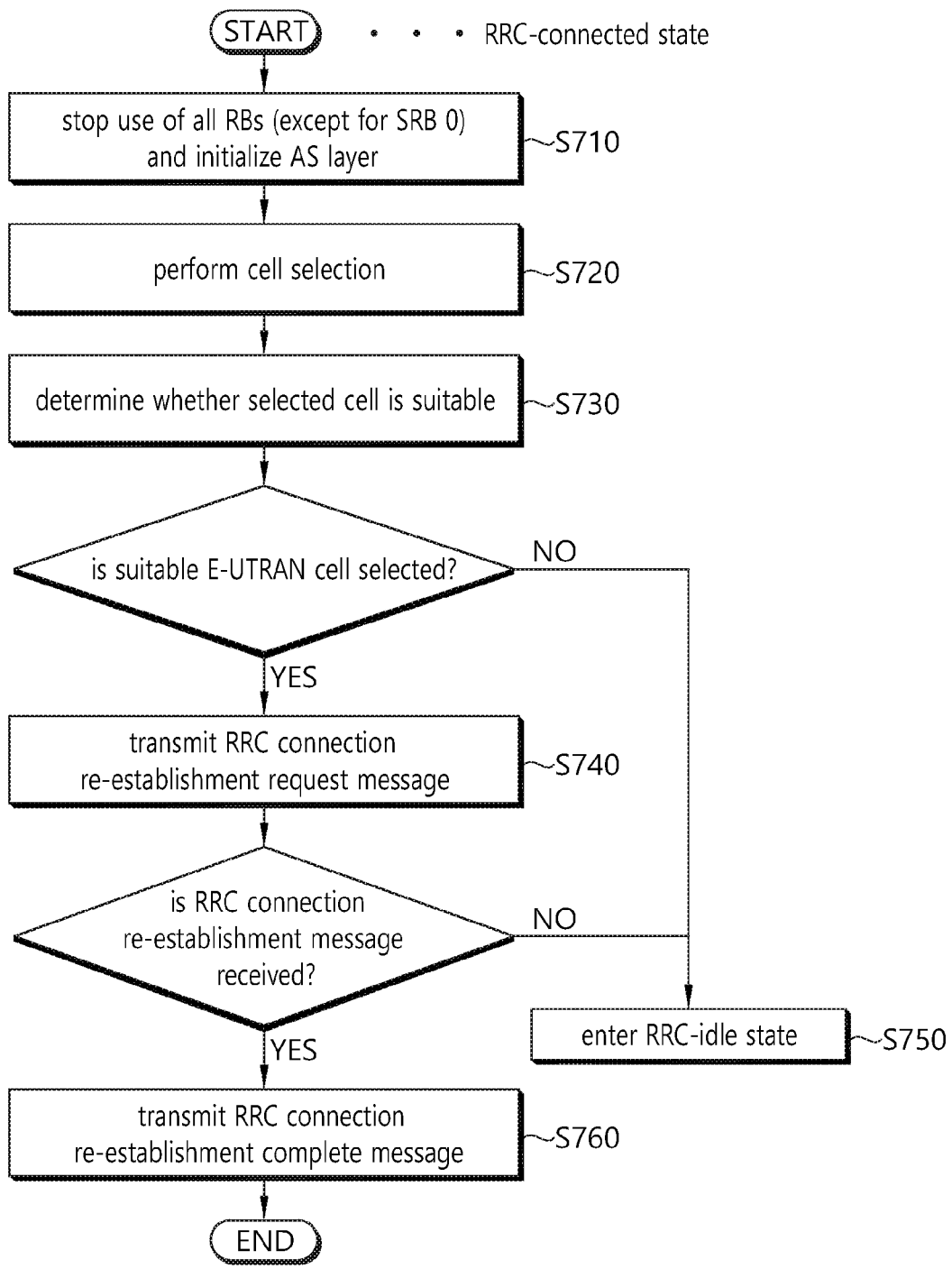
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Figure 8:
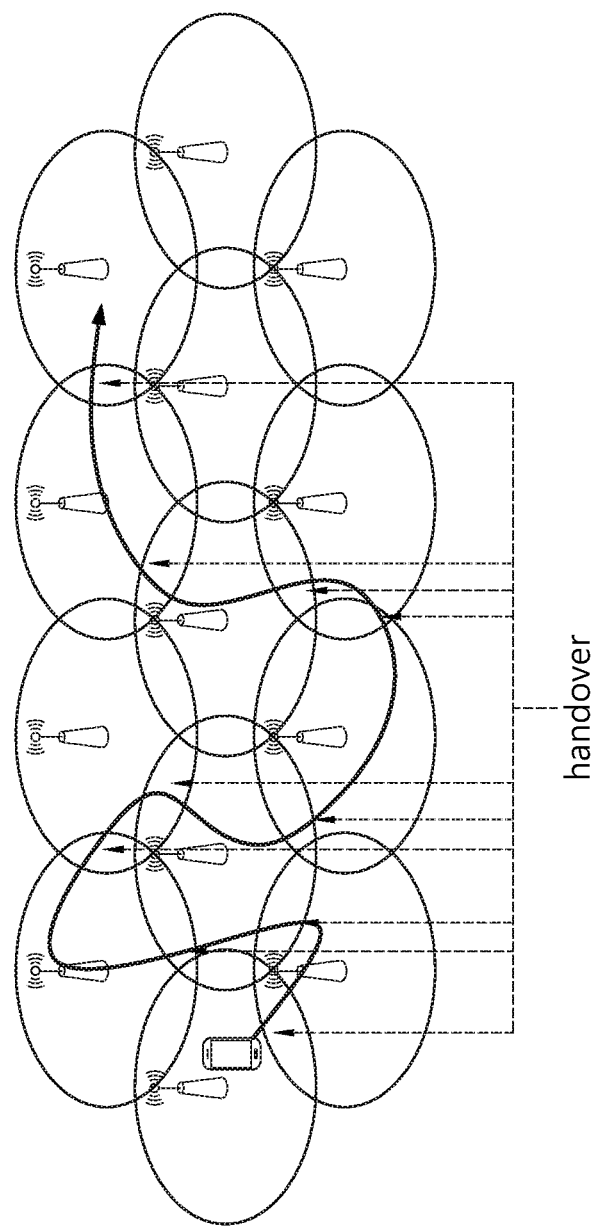
FIG. 8 illustrates the problem of a frequent handover that occurs to a moving UE with mobility in a dense environment of small cells.

FIG. 8 illustrates the problem of a frequent handover that occurs to a UE with mobility moving in a dense environment of small cells. As it becomes difficult to meet a growing demand for data from UEs with only one existing macrocell in recent times, a local area is served using a low-output microcell, femtocell, picocell, or the like. When the UE continuously moves in the dense environment of small cells, a frequent handover occurs according to a current handover procedure. Referring to FIG. 8, the movement of the UE causes 10 handovers in total. The UE suffers performance degradation in each handover, and a frequent handover may lead to a significant decrease in overall Quality of Service of the UE and to a substantial increase in overhead in signaling for a handover to a core network. This tendency becomes a serious issue in a future communication network environment in which a large number of small cells need to be installed and is a problem to be necessarily solved.

Therefore, to solve the foregoing problem, the present invention suggests a method for reducing the number of handovers. First, when a UE moves from a currently serving anchor cell to the service area of neighboring cells, two BSs or two or more BSs serve the UE through cooperative transmission while maintaining the anchor cell as it is, so that a handover to a neighboring cell does not occur. Subsequently, when the UE passes through the neighboring cell to move to the service area of another cell (anchor cell candidate) that is not adjacent to the currently serving anchor cell, a handover is only then performed. Accordingly, the application of the present invention may reduce the total number of handovers occurring per UE as compared with a conventional method.

Figure 9:
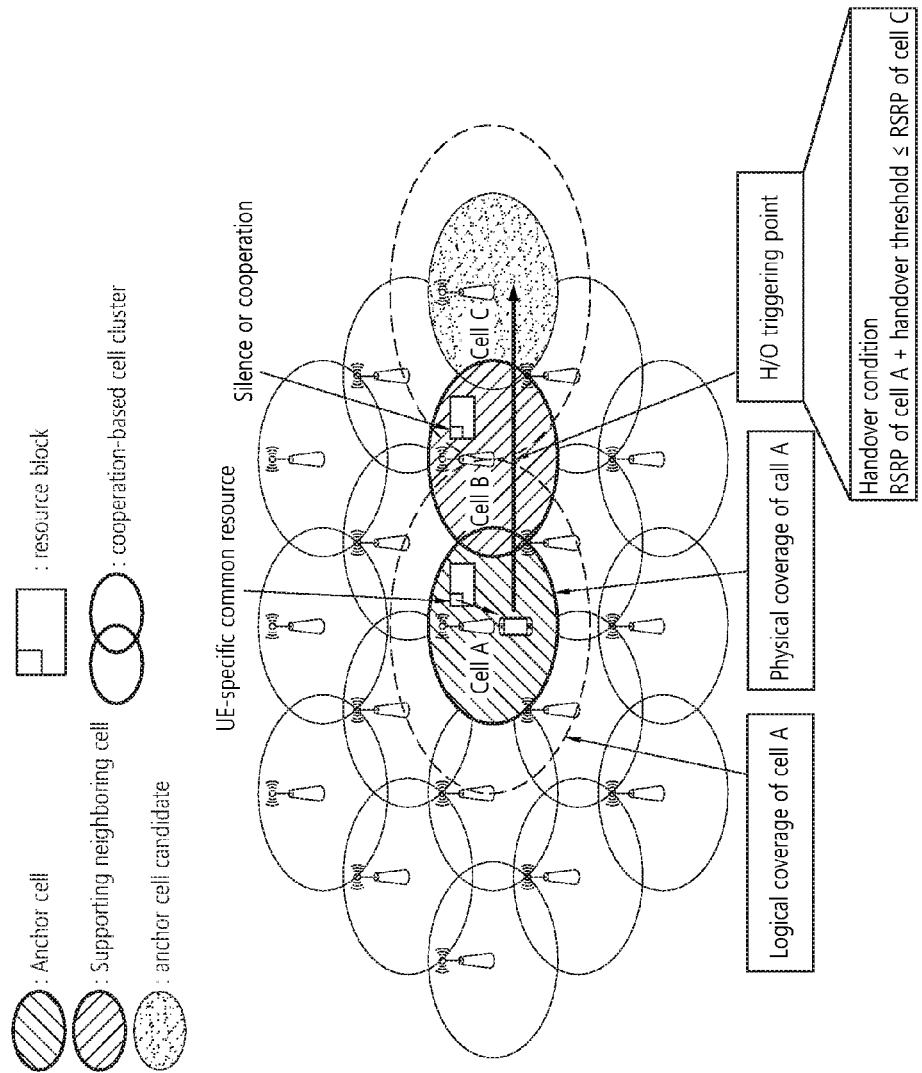
FIG. 9 illustrates a new handover technique suggested by the present invention.

FIG. 9 illustrates a new handover technique suggested by the present invention. As illustrated in FIG. 9, when a UE moves from cell A to cell C via cell B, a conventional handover method involves two handover processes in total including one between cell A and cell B and the other between cell B and cell B, while the suggested method involves only one handover, thus reducing the performance degradation of the UE and signaling overhead caused by a handover.

Specifically, referring to FIG. 9, the logical coverages of cell A and cell C are extended by cooperative transmission as compared with the physical coverages thereof. That is, when the UE moves from a serving cell (cell A) to an adjacent neighboring cell (cell B), the two cells may transmit data to the UE using cooperative communication through a cooperation-based cluster while maintaining the anchor cell serving the UE. Subsequently, when the UE leaves the logical coverage of cell A to move to the logical coverage of cell C, a handover only then occurs from cell A to cell C, and accordingly only one handover may be performed unlike in the conventional method.

Here, a triggering condition to cause a handover event may be determined by comparing the signal strengths of cell A and cell C measured by the UE. Specifically, in the example of FIG. 9, the triggering condition to cause the handover event is comparing the signal strength of cell C with the sum of the signal strength of cell A and a handover threshold. When the signal strength of cell C is the sum of the signal strength of cell A and the handover threshold or higher, a handover from cell A to cell C may be performed. The signal strengths may be at least one of a Received Signal Strength Indicator (RSSI), Reference Signal Received Power (RSRP), and Reference Signal Received Quality (RSRQ). For convenience, the following description will be made with reference to RSRP, without being limited thereto.

Hereinafter, proposed is a method of allocating a UE-specific common resource to enable inter-cell cooperative communication. In FIG. 9, UE A in cell A may be allocated, from cell A, a resource (UE-specific common resource) overlapping with that for another UE. Although moving, UE A performs communication through the resource allocated from cell A, also when UE A enters cell B present in the logical coverage of cell A. That is, when UE A enters the coverage of cell B, UE A performs cooperative communication with cell A and cell B through the allocated UE-specific common resource. Here, a UE-specific common resource of a cell adjacent to cell B is salient so as not to disturb the cooperative communication between cell A and cell B. When UE A enters the logical coverage of cell C and accordingly a handover is performed, cell B and cell C may perform cooperative communication using a UE-specific common resource of cell B.

Next, the present invention proposes a cooperation-based cell clustering method in order to enable the proposed handover technique. According to this method, an anchor cell a supporting neighboring cell for cooperation are formed in advance into a cooperation-based cell cluster to comprehensively and efficiently manage resources and the preset cooperation-based cell cluster is allowed to perform cooperation in actual cooperative communication to facilitate the performance and preparation of the cooperative communication. A cooperation-based cell cluster may be represented or constructed by a cooperation-based cell cluster table.

Figure 10:
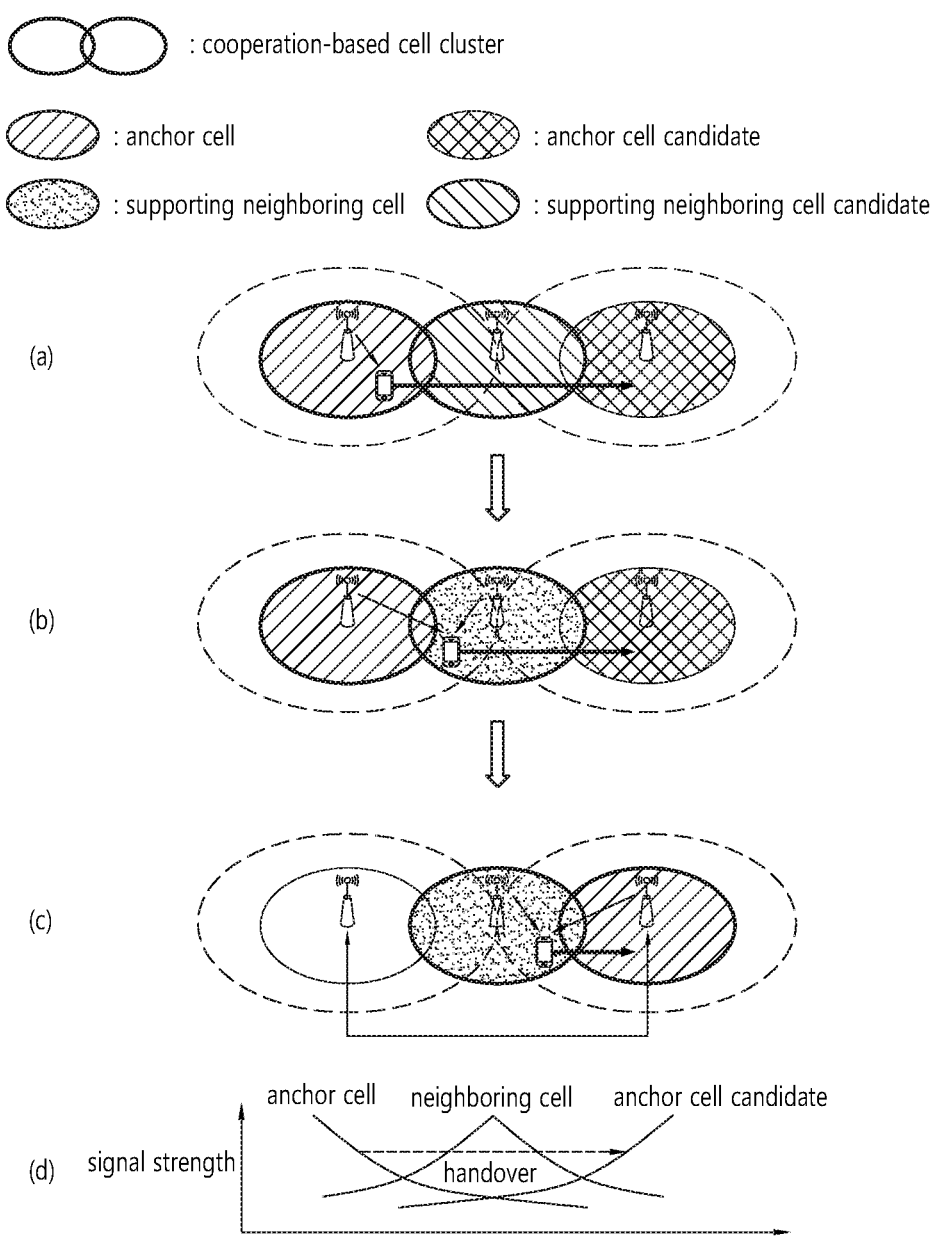
FIG. 10 illustrates a procedure for a handover method using suggested cooperation-based cell clustering.

FIG. 10 illustrates a procedure for a handover method using suggested cooperation-based cell clustering.

Referring to FIG. 10, as illustrated in (a) of FIG. 10, when a cell serving a UE first is an anchor cell, a neighboring cell having the highest RSRP among neighboring cells of the anchor cell is included in a cooperation-based cell cluster as a supporting neighboring cell candidate for future cooperative communication. Here, one anchor cell and one supporting neighboring cell candidate may configure a cooperation-based cell cluster, or one anchor cell and a plurality of supporting neighboring cell candidates may configure a cooperation-based cell cluster. That is, the number of supporting neighboring cell candidates to be included in the cooperation-based cell cluster may be adjusted as necessary. The above state in which the UE is served by one anchor cell and the cooperation-based cell cluster includes only the supporting neighboring cell candidate is defined as a level 1 state.

Subsequently, as illustrated in (b) of FIG. 10, when the UE moves and thus the RSRP of the anchor cell is less than the sum of the RSRP of the cell as the supporting neighboring cell candidate and a cooperation threshold, the anchor cell and the supporting neighboring cell may perform cooperative communication. Here, an anchor point of the cooperative communication is not changed, so that no handover occurs and the cooperation-based cell cluster may be maintained without any change. This state in which the UE includes the anchor cell and the supporting neighboring cell in the cooperation-based cell cluster to perform cooperative communication is defined as a level 2 state.

Finally, as illustrated in (c) of FIG. 10, when the UE further moves and thus the RSRP of a cell next to the supporting neighboring cell is the sum of the RSRP of the anchor cell and the handover threshold or higher, a handover may be preformed to replace the anchor point with the handed-over cell. Here, the supporting neighboring cell may be maintained as it is, and the cooperative communication may be possible immediately after the handover is performed. Therefore, the UE is maintained in the level 2 state, and when the UE completely moves to the coverage of a new anchor cell and is served by the new anchor cell, the UE stops a cooperation mode and returns to the level 1 state. Subsequently, the above process may be repeated.

Figure 11:
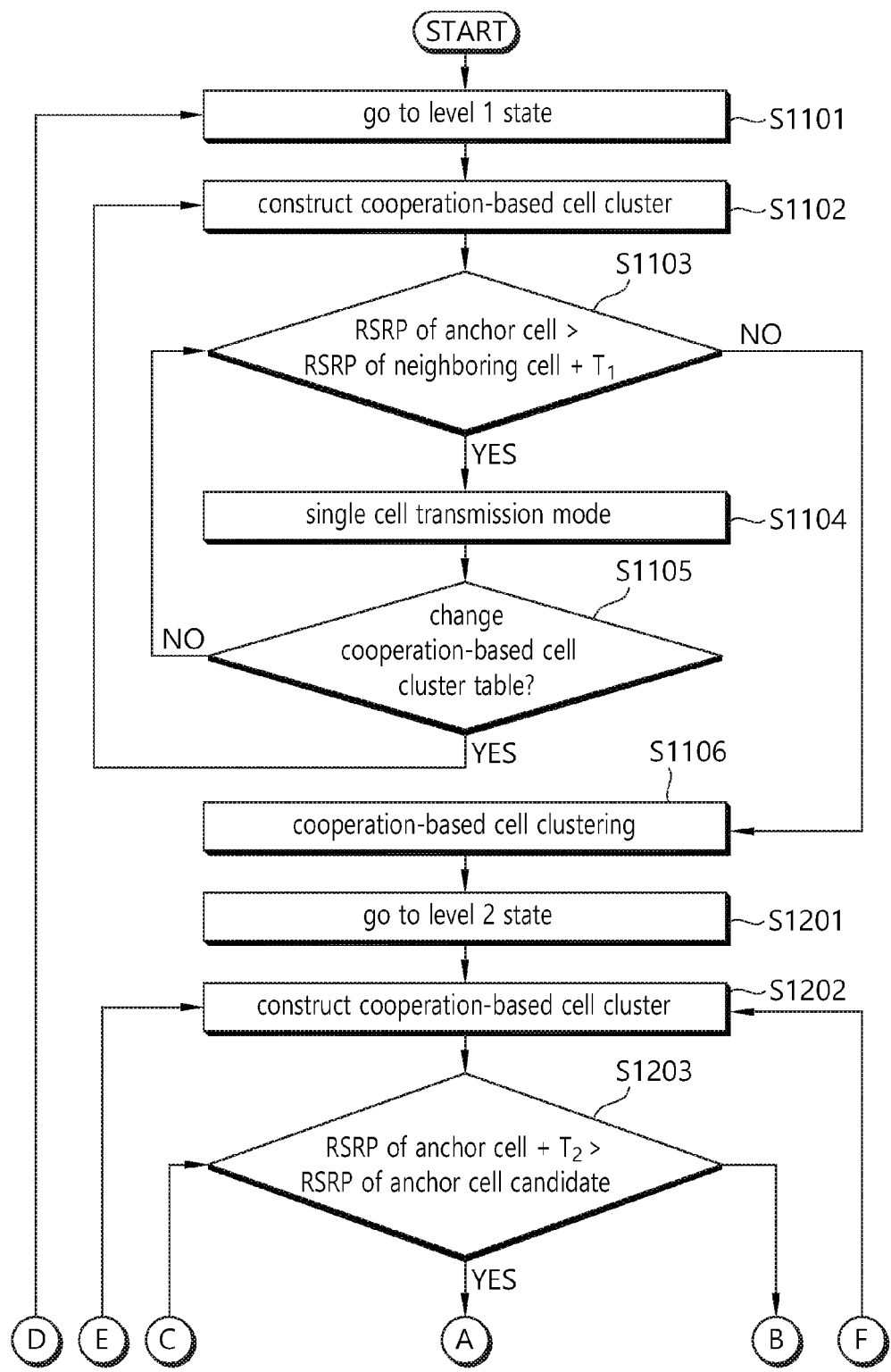
FIG. 11 and FIG. 12 are a flowchart illustrating a process for performing cooperative communication and a handover based on suggested cooperation-based cell clustering.
Figure 12:
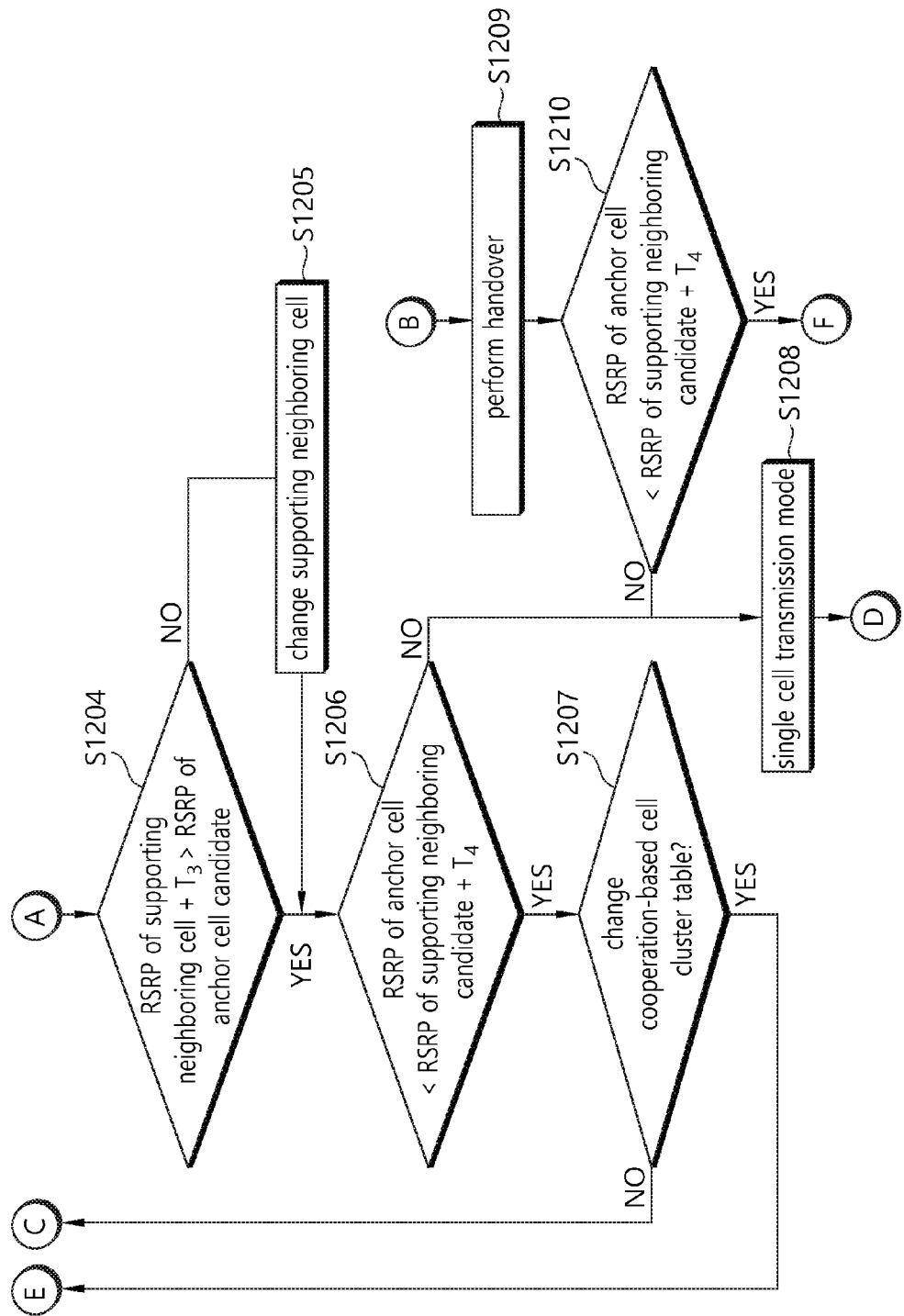

FIG. 11 and FIG. 12 are a flowchart illustrating a handover method using suggested cooperation-based cell clustering. As illustrated in FIG. 11 and FIG. 12, it is possible to achieve the suggested method only when operations to be performed by a BS and a UE in the level 1 state and the level 2 state are separately defined. Here, an RSRP threshold for the selection and release of a cooperative cell in the level 1 state (hereinafter, referred to as a first cooperation threshold), an RSRP threshold for the selection and release of a cooperative cell in the level 2 state (hereinafter, referred to as a second cooperation threshold), an RSRP threshold for the selection and release of a handover (hereinafter, referred to as a handover threshold), and an RSRP threshold for changing a supporting neighboring cell (hereinafter, referred to as a substitute threshold) may be set to be different. Hereinafter, FIG. 11 and FIG. 12 are described in detail.

FIG. 11 and FIG. 12 are a flowchart illustrating a process for performing cooperative communication and a handover based on suggested cooperation-based cell clustering.

Referring to FIG. 11 and FIG. 12, first, in the level 1 state (S1101), the UE may collect RSRP information on neighboring cells in order to determine whether to perform a cooperative communication mode with a neighboring cell, and the BS may construct a cooperation-based cell cluster using an RSRP table (S1102). The BS may compare the RSRP of an anchor cell with the sum of the RSRP of a neighboring cell and the cooperation threshold to determine whether to perform cooperative communication with the neighboring cell (S1103). When the RSRP of the anchor cell exceeds the sum of the RSRP of the neighboring cell and the first cooperation threshold (T1), the anchor cell may operate in a single cell transmission mode (S1104), may determine whether the cooperation-based cell cluster is changed (S1105), and may reconstruct the cooperation-based cell cluster if changed (S1102) or may re-determine whether to perform the cooperative communication if not changed (S1103). When the RSRP of the anchor cell is the sum of the RSRP of the neighboring cell and the first cooperation threshold (T1) or less, the anchor cell may perform cooperative communication with the neighboring cell (S1106) and may go to the level 2 state (S1201). Hereinafter, the neighboring cell performing the cooperative communication with the anchor cell is referred to as a supporting neighboring cell.

Next, in the level 2 state (S1201), the UE may collect RSRP information on a neighboring cell in order to determine whether to go back to the level 1 state, in which transmission is received only via the anchor cell (S1206), to change the supporting neighboring cell (S1204), or to perform a handover procedure for changing the anchor cell (S1203), and may go to a corresponding mode according to a satisfied condition. Hereinafter, the level 2 state is described in detail.

In the level 2 state, the BS may construct a cooperation-based cell cluster using an RSRP table (S1202). Here, the RSRP table in the level 1 state includes only RSRP information on the anchor cell and the neighboring cells, while the RSRP table in the level 2 state may include not only the RSRP information on the anchor cell and the neighboring cells but also RSRP information on a cell that is not adjacent to the anchor cell but is adjacent to the supporting neighboring cell (hereinafter, referred to as an anchor cell candidate). This is for smoothly performing a handover during cooperative communication.

The BS may determine whether to perform a handover from the anchor cell to the anchor cell candidate (S1203). When the RSRP of the anchor cell candidate is the sum of the RSRP of the anchor cell and the handover threshold (T2) or higher, the handover from the anchor cell to the anchor cell candidate may be performed (S1209). Here, cooperative communication between the anchor cell candidate and the supporting neighboring cell may be maintained. After performing the handover to the anchor cell candidate, when the RSRP of the anchor cell candidate is the sum of the RSRP of the neighboring cell and the second cooperation threshold (T4) or higher, the anchor cell candidate may release the cooperative communication to operate in the single cell transmission mode (S1208) and may go to the level 1 state (S1101). When the RSRP of the anchor cell candidate is less than the sum of the RSRP of the neighboring cell and the second cooperation threshold (T4), the anchor cell may maintain the cooperative communication with the supporting neighboring cell and may reconstruct the cooperation-based cell cluster (S1202).

When the RSRP of the anchor cell candidate is less than the sum of the RSRP of the anchor cell and the handover threshold (T2), the handover to the anchor cell candidate does not occur and the BS may determine whether to change the supporting neighboring cell (S1204). When the RSRP of another neighboring cell adjacent to the anchor cell is the sum of the RSRP of the supporting neighboring cell and the substitute threshold (T3) or higher, a cell performing cooperative communication with the anchor cell may be changed from the supporting neighboring cell to the neighboring cell adjacent to the anchor cell (S1205). When the RSRP of the neighboring cell adjacent to the anchor cell is less than the sum of the RSRP of the supporting neighboring cell and the substitute threshold (T3), the cooperative communication with the supporting neighboring cell may be maintained.

Subsequently, the anchor cell may determine whether to maintain the cooperative communication with the supporting neighboring cell (S1206). When the RSRP of the anchor cell is the sum of the RSRP of the supporting neighboring cell and the second cooperation threshold (T4) or higher, the anchor cell may operate in the single cell transmission mode and may go to the level 1 state (S1101). When the RSRP of the anchor cell is less than the sum of the RSRP of the supporting neighboring cell and the second cooperation threshold (T4), the anchor cell may maintain the cooperative communication with the supporting neighboring cell, may determine whether the cooperation-based cell cluster is changed, and may reconstruct the cooperation-based cell cluster if changed (S1202) or may re-determine whether to perform a handover if not changed (S1203). When cooperative communication and a handover between BSs are performed according to the foregoing process, the number of handovers in the environment of small cells may be remarkably reduced.

FIGS. 13 to 16 illustrate embodiments of a handover method using suggested cooperation-based cell clustering. Referring to FIGS. 13 to 16, suppose that a UE sequentially moves to the coverages of cells 1, 5, 4 and 10 and each UE receives and collects RSRP information on a neighboring cell and cells in coverage outside the neighboring cell to has an RSRP table. A BS may construct a cooperation-based cell cluster and may perform cooperative communication and a handover using the table. Here, the RSRP table may be replaced with various types of information, such as RSRI, RSRQ, UE location information, and information on a distance between the BS and a UE, or may be used in combination therewith. Hereinafter, FIGS. 13 to 16 are described in detail.

Figure 13:
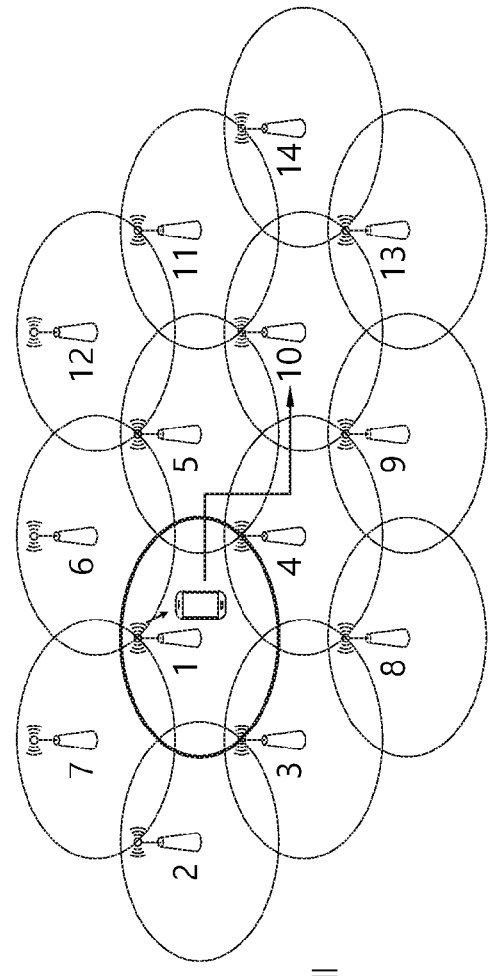
FIG. 13 illustrates an embodiment of a pre-cooperative communication operation in the handover method using suggested cooperation-based cell clustering.

FIG. 13 illustrates an embodiment of a pre-cooperative communication operation in the handover method using suggested cooperation-based cell clustering.

Referring to FIG. 13, the UE has cell 1 as an anchor cell and is in the level 1 state of being served only by BS 1. Here, since the UE needs to be subjected to the level 2 state to be handed over, the RSRP table includes only information on neighboring cells as candidate cells available for cooperation according to an RSRP level. Since it is assumed that two cells are involved in cooperation at cooperative communication in this embodiment, a cooperation-based cell cluster includes only two cells. Therefore, cell 1, which is the anchor cell currently serving the UE, and cell 5 with the highest RSRP among the neighboring cells are included in the cooperation-based cell cluster.

Figure 14:
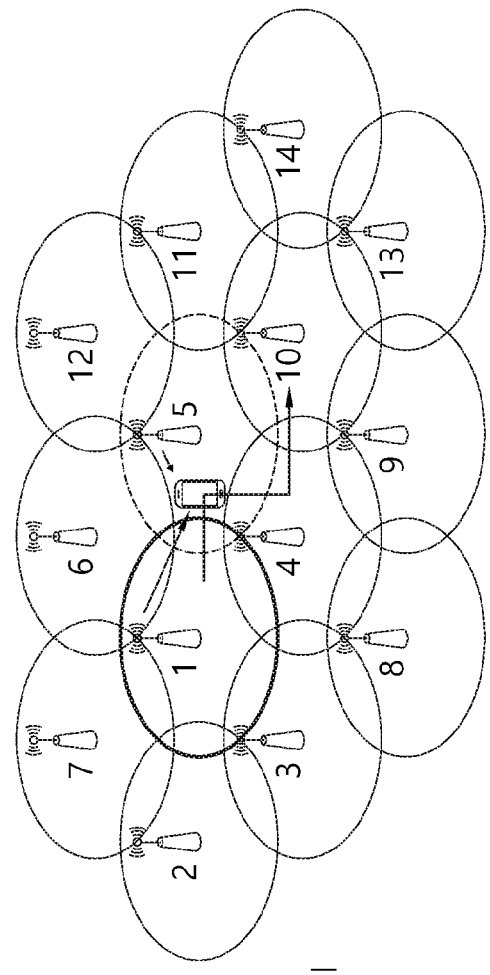
FIG. 14 and FIG. 15 illustrate an embodiment following cooperative communication and preceding a handover in the handover method using suggested cooperation-based cell clustering.
Figure 15:
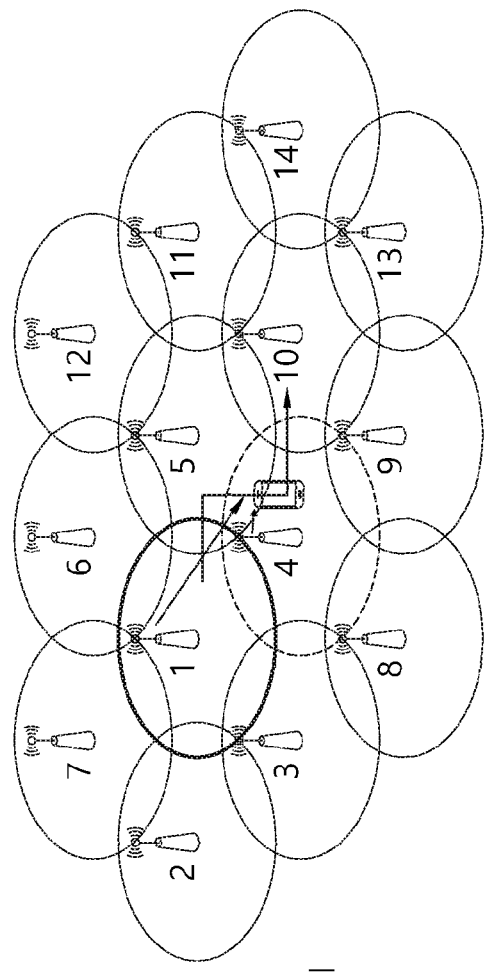

FIG. 14 and FIG. 15 illustrate an embodiment following cooperative communication and preceding a handover in the handover method using suggested cooperation-based cell clustering.

Referring to FIG. 14 and FIG. 15, FIG. 14 illustrates that the UE moves to the coverage of cell 5 and is in the level 2 state of receiving cooperative communication simultaneously from cell 1 and cell 5. Here, the RSRP table may include not only a neighboring cell of cell 1 but also potential handover cells in coverage outside the neighboring cell, because it is possible to handover the UE in the level 2 state. FIG. 15 illustrates that the UE moves to the coverage of cell 4 and receives cooperative communication simultaneously from cell 1 and cell 4. Here, the level 2 state is maintained. Since cell 1 is still present in the cooperation-based cell cluster, cell 1 is fixed as the anchor cell and the supporting neighboring cell is changed to cell 4. Therefore, a handover of changing the anchor cell has not yet occurred.

Figure 16:
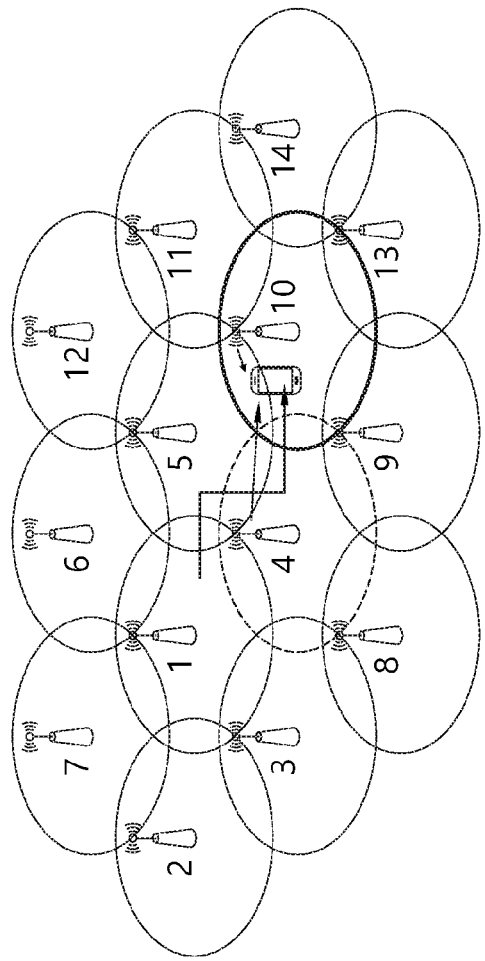
FIG. 16 illustrates an embodiment of performing a handover in the handover method using suggested cooperation-based cell clustering.

FIG. 16 illustrates an embodiment of performing a handover in the handover method using suggested cooperation-based cell clustering.

Referring to FIG. 16, the UE moves from the coverage of cell 4 to the coverage of cell 10, so that a handover occurs to change the anchor cell from cell 1 to cell 10. Here, cell 10, which becomes the anchor cell simultaneously with the handover occurring, performs cooperative communication with cell 4 as an existing supporting neighboring cell, and thus the level 2 state is maintained. Finally, when the UE moves to the coverage served only by cell 10, the UE may go to the level 1 state and may repeat the foregoing procedure.

Figure 17:
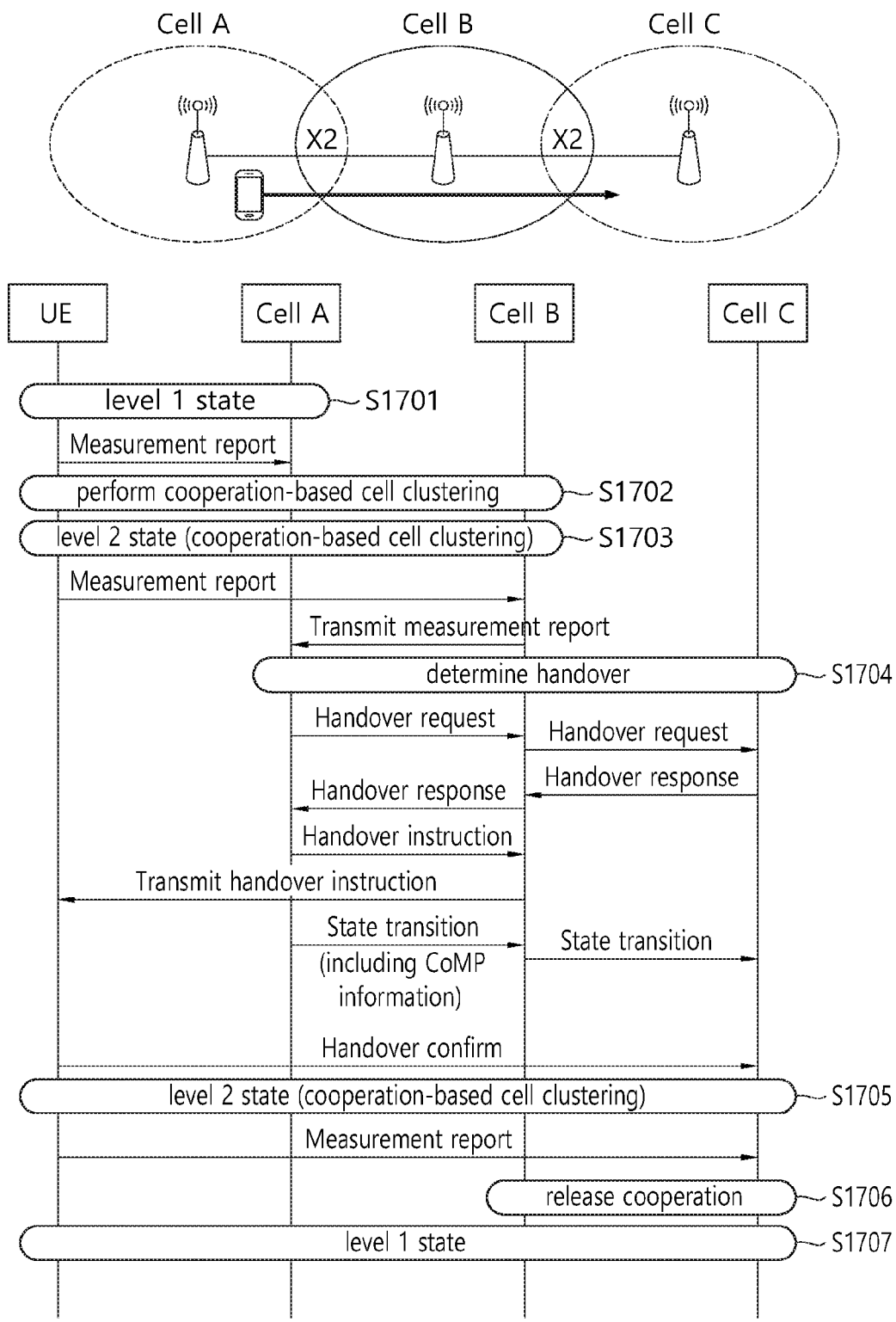
FIG. 17 illustrates an embodiment of a handover signaling procedure when the handover method using suggested cooperation-based cell clustering is applied.

FIG. 17 illustrates an embodiment of a handover signaling procedure when the handover method using suggested cooperation-based cell clustering is applied. The description is based on small cells, assuming that the cells are connected to neighboring cells via an X2 interface.

Referring to FIG. 14, a UE is served by cell A as an anchor cell and is in the level 1 state (S1701). When the UE measures the signal strength of a neighboring cell and reports a measurement to cell A, a BS performs cooperation-based cell clustering using the measurement report (S1702), and goes to the level 2 state in which cell A and cell B perform cooperative communication (S1703) when a cooperative communication condition is satisfied. In the level 2 state, when the UE measures the signal strength of a neighboring cell and reports a measurement to cell B, cell B transmits the measurement report to cell A. When the UE moves from cell B to cell C so that cell A determines to perform a handover to cell C (S1704), the handover is performed from cell A to cell C via handover request, handover response, and handover instruction processes and the level 2 state in which cells C and cell B perform cooperative communication is maintained (S1705). Next, the UE measures the signal strength of a neighboring cell and reports a measurement to cell C. When a cooperative communication release condition is satisfied so that cell C determines to release the cooperative communication (S1706), the UE goes to the level 1 state and cell C operates in the single cell transmission mode (S1707). That is, the suggested handover technique involves only one handover in total while the UE sequentially moves to cell A, cell B, and cell C, thus reducing signaling overhead by a handover.

Here, since a handover occurs when the UE is located in the coverage of a neighboring cell and an anchor cell is responsible for control signal information for the handover, the neighboring cell needs to additionally have a function of receiving the control signal information from the anchor cell and delivering the control signal information. However, since the UE is not connected to the supporting neighboring cell and thus is unable to recognize a scrambling code of a control channel of the supporting neighboring cell, the supporting neighboring cell is unable to simply deliver the control signal information for the handover. Accordingly, the present invention generally suggests three methods.

First, the control signal information may be embedded and transmitted in an allocated specific data channel, instead of being transmitted via the control channel of the supporting neighboring cell. To this end, an enhanced Physical Downlink Control Channel (e-PDCCH) suggested in Release 11 may be used. In this case, however, the utilization of the data channel is reduced.

Figure 18:
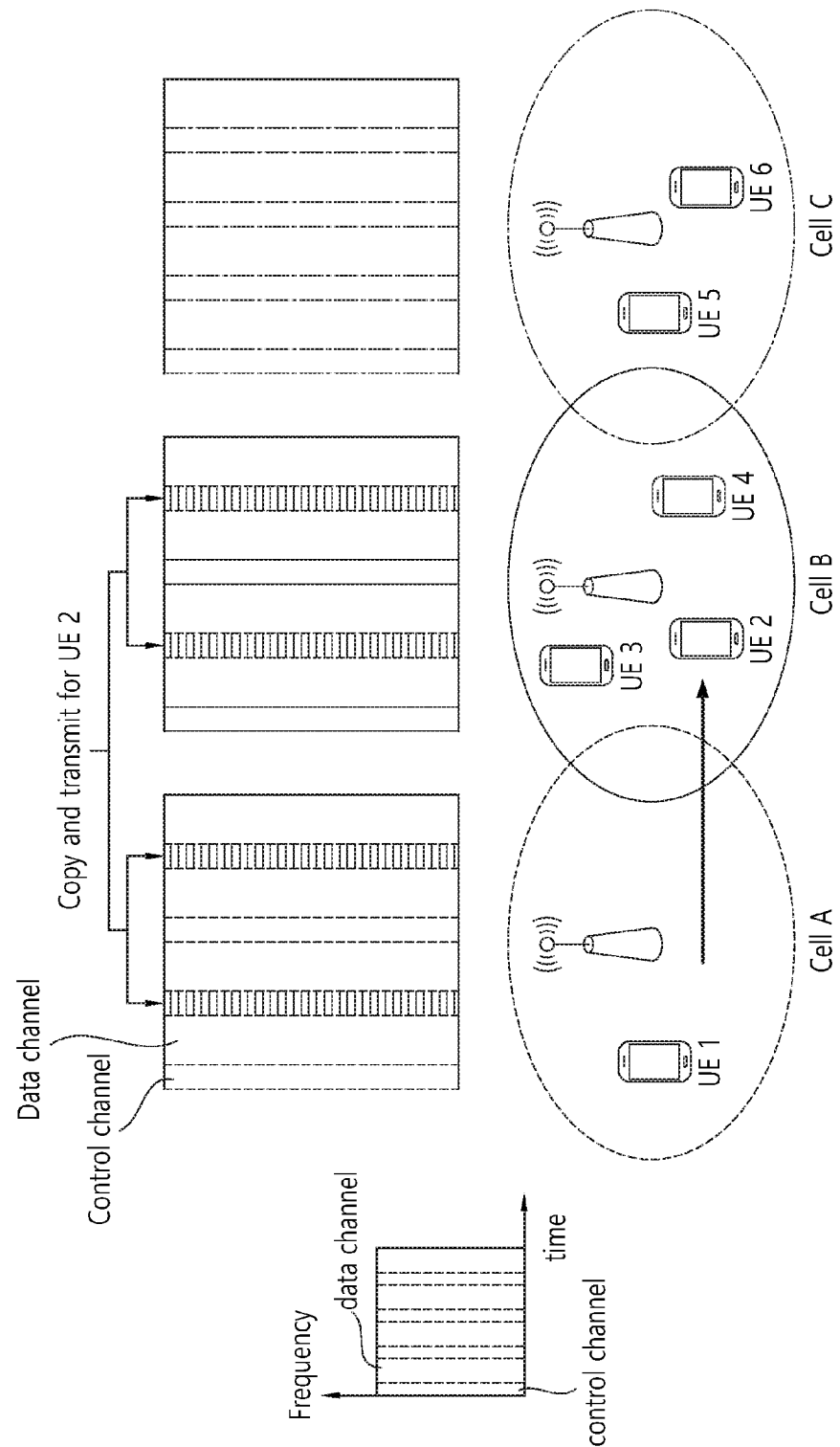
FIG. 18 and FIG. 19 illustrate an embodiment of a method of copying control channel information on an anchor cell and periodically transmitting the control channel information in a control channel of a supporting neighboring cell.
Figure 19:
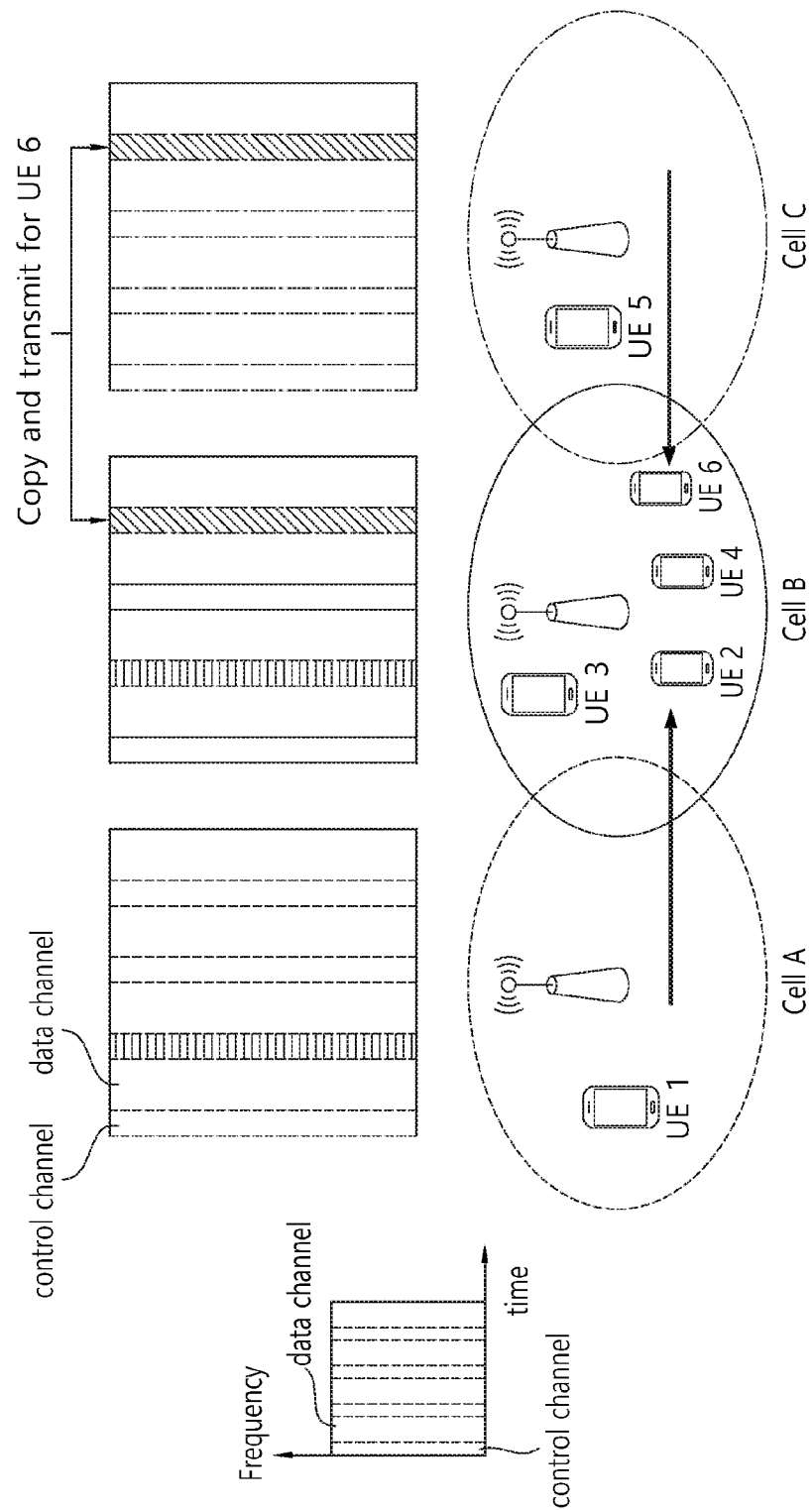

Second, simply, control channel information on the anchor cell is copied and periodically transmitted in the control channel of the supporting neighboring cell. FIG. 18 and FIG. 19 illustrate an embodiment of a method of copying control channel information on an anchor cell and periodically transmitting the control channel information in a control channel of a supporting neighboring cell. For example, as illustrated in FIG. 18, when UE 2 moves from cell A to cell B, control channel information on channel A is copied and periodically transmitted in a control channel of channel B. As illustrated in FIG. 19, when UE 2 and UE 6 move to cell B, cell A and cell C copy and periodically transmit control channel information in the control channel of channel B. Here, according to this method, during a period in which the control channel information on the anchor cell is copied and transmitted, control information for users directly connecting to the supporting neighboring cell to be served is not transmitted. However, since it is considered that resources for data and control information are sufficient in a dense environment of small cells, the foregoing two methods are determined as being applicable.

Figure 20:
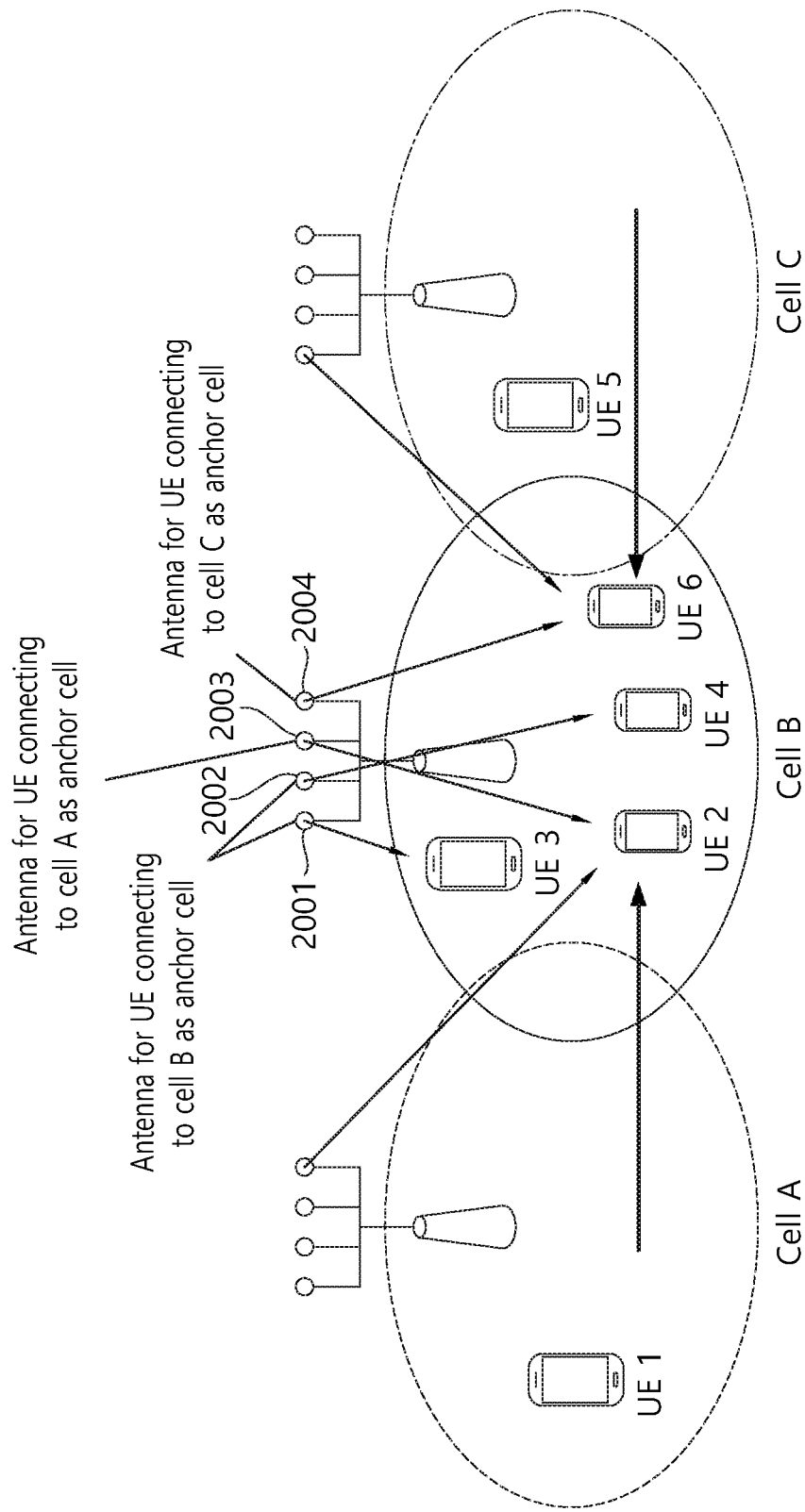
FIG. 20 illustrates a multi-antenna transmission method.

Third, a multi-antenna transmission method may be used. FIG. 20 illustrates the multi-antenna transmission method. Referring to FIG. 20, it is configured using the multi-antenna transmission method that control information is transmitted via antennas 2001 and 2002 to UE 3 and UE 4 that are connected to cell B as an anchor cell and control channel information is transmitted via antennas 2003 and 2004 to UE 2 and UE 6 that are connected to cell c as a supporting neighboring cell.

A function to be added to a BS for a UE to receive control information from a supporting neighboring cell has been described, and the UE also needs to have an additional function. Assuming that the simple method of copying and periodically transmitting control channel information on an anchor cell in a control channel of a supporting neighboring cell is used, a reference signal is still transmitted as a reference signal specific to the supporting neighboring cell. Thus, the UE needs to receive control information from a cell corresponding to the reference signal specific to the supporting neighboring cell. Since a reference signal can be received without connection to a BS, a reference signal transmitted to the UE from a cell with an RSRP of a specific threshold or higher is configured for the UE to attempt to decode a control channel in order to receive data without connection to the supporting neighboring cell.

Figure 21:
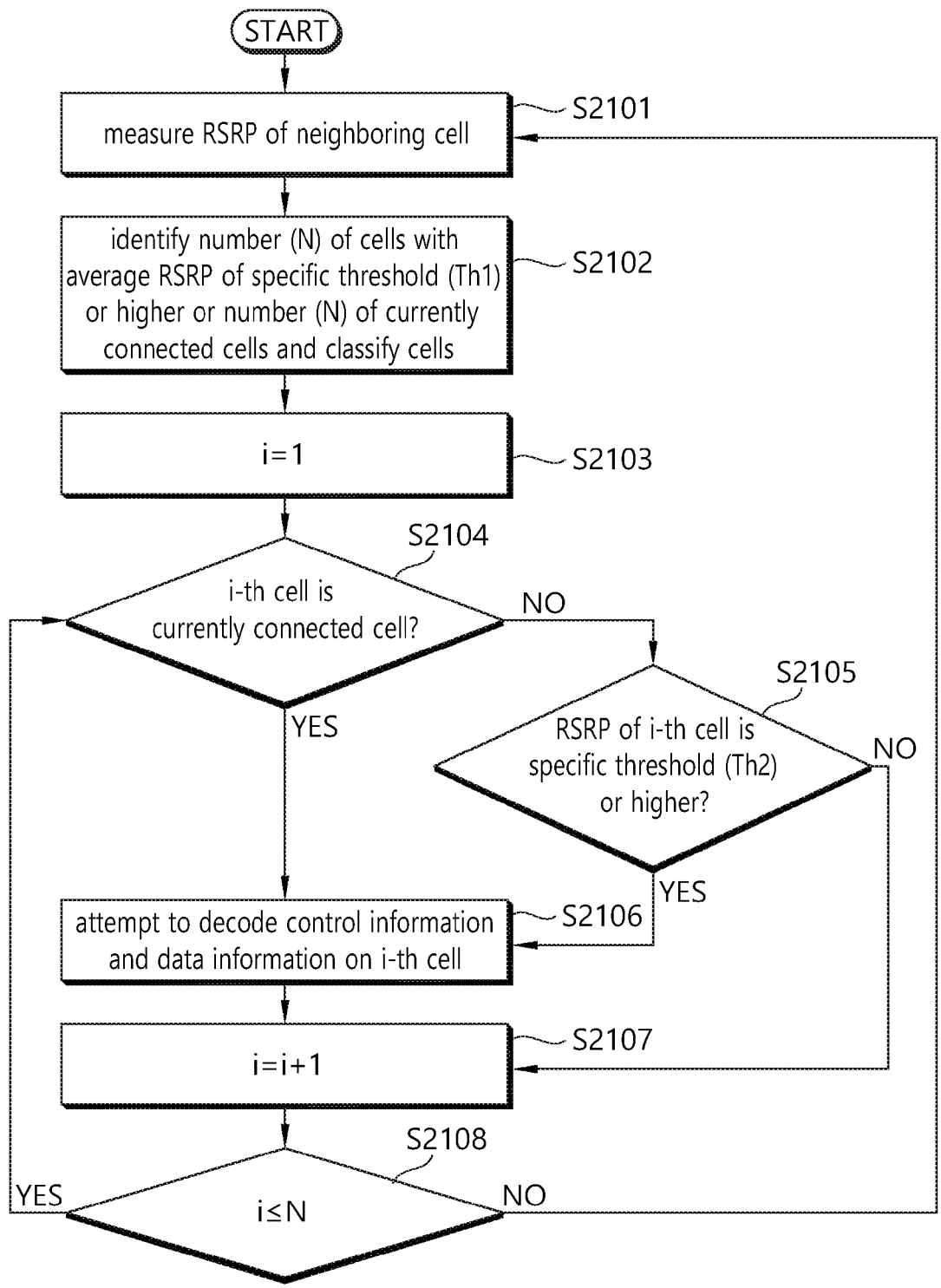
FIG. 21 is a flowchart illustrating a determination process in which a UE determines whether to decode a control channel.

FIG. 21 is a flowchart illustrating a determination process in which a UE determines whether to decode a control channel.

First, the UE may determine the RSRP of a neighboring cell (S2101). The UE may identify the number (N) of cells with an average RSRP of a specific threshold or higher or the number (N) of currently connected cells and may classify the cells (S2102). The UE sets an initial value of i=1 (S2103) and determines whether to decode control information and data information on the N cells while increasing i by 1. Specifically, when an i-th cell is a currently connected cell (S2104), the UE may decode control information and data information on the i-th cell (S2106). When the i-th cell is not a currently connected cell and the RSRP of the i-th cell is a specific threshold or higher (S2105), the UE may decode the control information and data information on the i-th cell (S2106). According to the foregoing process, the UE may receive control information and data information without connecting to a supporting neighboring cell.

Figure 22:
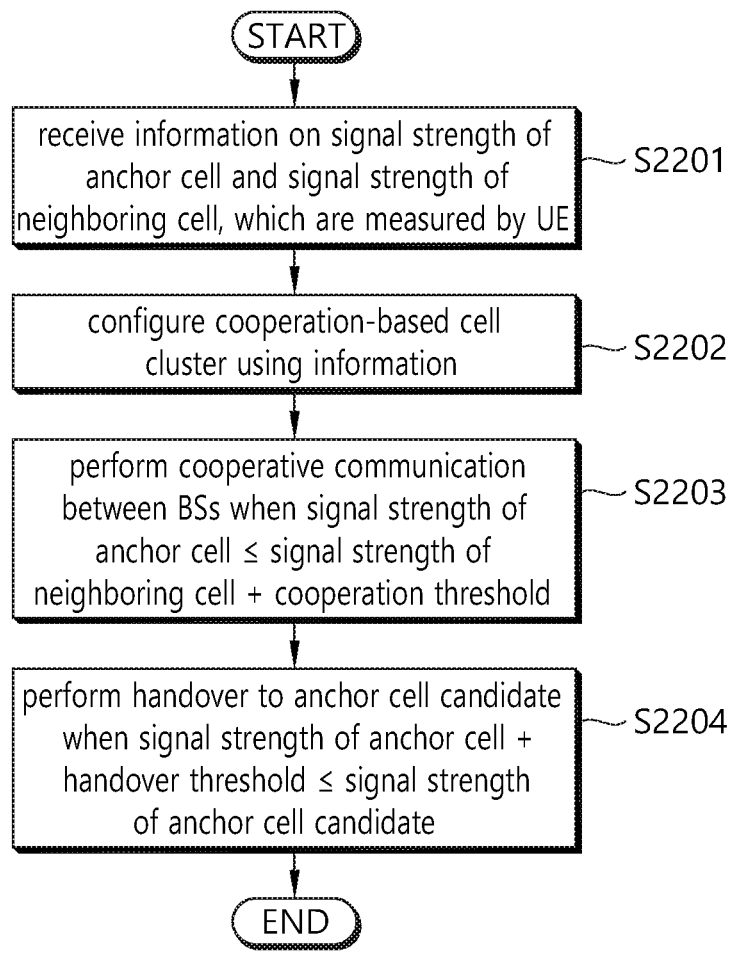
FIG. 22 is a block diagram illustrating a method for performing cooperative transmission and a handover according to one embodiment of the present invention.

FIG. 22 is a block diagram illustrating a method for performing cooperative transmission and a handover according to one embodiment of the present invention.

Referring to FIG. 22, a BS may receive information on the signal strength of an anchor cell and the signal strength of a neighboring cell, which are measured by a UE (S2201), and may configure a cooperation-based cell cluster using the information (S2202). When the signal strength of the anchor cell is the sum of the signal strength of the neighboring cell and a cooperation threshold or less, the anchor cell and the neighboring cell may perform cooperative communication (S2203). When the signal strength of an anchor cell candidate is the sum of the signal strength of the anchor cell and a handover threshold or greater during the cooperative communication, a handover from the anchor cell to the anchor cell candidate may be performed (S2204).

Figure 23:
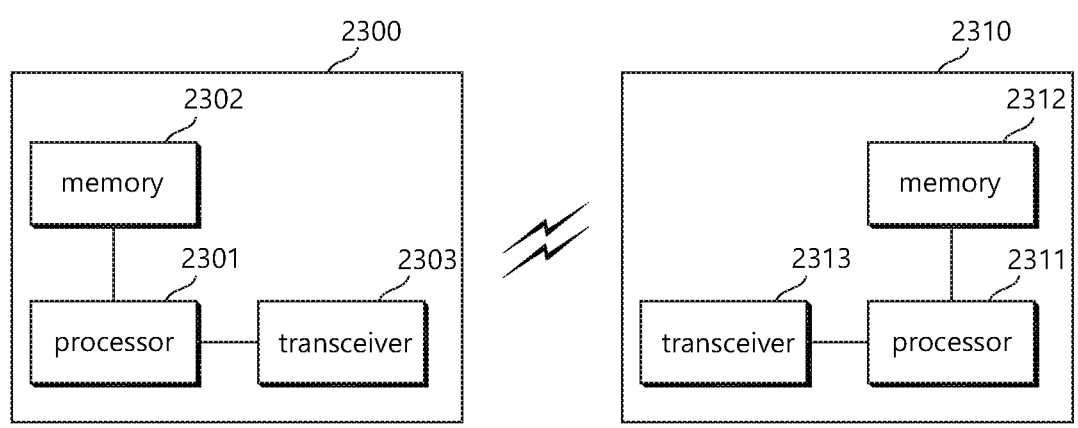
FIG. 23 is a block diagram illustrating a wireless communication system according to the embodiment of the present invention.

FIG. 23 is a block diagram illustrating a wireless communication system according to the embodiment of the present invention.

A BS 2300 includes a processor 2301, a memory 2302 and a transceiver 2303. The memory 2302 is connected to the processor 2301, and stores various information for driving the processor 2301. The transceiver 2303 is connected to the processor 2301, and transmits and/or receives radio signals. The processor 2301 implements proposed functions, processes and/or methods. In the above embodiment, an operation of the base station may be implemented by the processor 2301.

A UE 2310 includes a processor 2311, a memory 2312 and a transceiver 2313. The memory 2312 is connected to the processor 2311, and stores various information for driving the processor 2311. The transceiver 2313 is connected to the processor 2311, and transmits and/or receives radio signals. The processor 2311 implements proposed functions, processes and/or methods. In the above embodiment, an operation of the base station may be implemented by the processor 2311.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of performing a handover by an anchor base station (BS) in a mobile communication system comprising a plurality of cells, the method comprising:
   receiving information on a signal strength of an anchor cell and a signal strength of at least one neighboring cell, which are measured by a user equipment (UE),
   wherein the anchor cell is a cell currently serving the UE and the at least one neighboring cell is at least one cell adjacent to the anchor cell;
   determining a supporting neighboring cell among the at least one neighboring cell,
   wherein the determined supporting neighboring cell is a cell having a highest signal strength among the at least one neighboring cell;
   configuring a cooperation-based cell cluster with information on the anchor cell and the determined supporting neighboring cell;
   performing cooperative communication between the anchor cell and the determined supporting neighboring cell based on the cooperation-based cell cluster when the signal strength of the anchor cell is a sum of a signal strength of the determined supporting neighboring cell and a first cooperation threshold or less;
   during performing the cooperative communication between the anchor cell and the determined supporting neighboring cell, receiving information on a signal strength of at least one anchor cell candidate,
   wherein the at least one anchor cell candidate is at least one cell adjacent to the determined supporting neighboring cell and is not adjacent to the anchor cell; and
   performing a handover from the anchor cell to a specific anchor cell candidate when the signal strength of the specific anchor cell candidate is a sum of the signal strength of the anchor cell and a handover threshold or greater,
   wherein the specific anchor cell candidate is a cell having the highest signal strength among the at least one anchor cell candidate,
   wherein the information on signal strength is at least one of a Received Signal Strength Indicator (RSSI), Reference Signal Received Power (RSRP) or Reference Signal Received Quality (RSRQ), and
   wherein the anchor cell is unchanged in the cooperative communication, and the anchor cell is changed to the specific anchor cell candidate in the handover.

2. The method of claim 1, further comprising:
   after performing the handover from the anchor cell to the first anchor cell releasing the cooperative communication with the supporting neighboring cell when the signal strength of the specific anchor cell candidate is a sum of the signal strength of the determined supporting neighboring cell and a second cooperation threshold or greater.

3. The method of claim 1, further comprising:
   changing the determined supporting neighboring cell to another neighboring cell of the at least one neighboring cell, when the handover from the anchor cell to the specific anchor cell candidate is not performed and the signal strength of the another neighboring cell is a sum of the signal strength of the determined supporting neighboring cell and a substitute threshold or greater.

4. The method of claim 3, further comprising:
   after changing the determined supporting neighboring cell to the another neighboring cell, releasing the cooperative communication with the another neighboring cell when the signal strength of the anchor cell is a sum of a signal strength of the another neighboring cell and a second cooperation threshold or greater.

5. The method of claim 1, further comprising:
   allocating a UE-specific common resource for performing the cooperative communication between the anchor cell and the determined supporting neighboring cell.

6. The method of claim 1, wherein the determined supporting neighboring cell transmits control channel information on the anchor cell in a data channel.

7. The method of claim 1, wherein the determined supporting neighboring cell copies control channel information on the anchor cell and periodically transmits the control channel information on the anchor cell in a control channel of the determined supporting neighboring cell.

8. The method of claim 1, wherein the determined supporting neighboring cell transmits control channel information on the anchor cell using a multi-antenna.

9. An apparatus for performing a handover in a mobile communication system comprising a plurality of cells, the apparatus comprising:
   a memory;
   a transciever; and
   a processor, operatively coupled to the memory and the transceiver, that:
      controls the transceiver to receive information on a signal strength of an anchor cell and a signal strength of at least one neighboring cell, which are measured by a user equipment (UE),
      wherein the anchor cell is a cell currently serving the UE and the at least one neighboring cell is at least one cell adjacent to the anchor cell,
      determines a supporting neighboring cell among the at least one neighboring cell, wherein the determined supporting neighboring cell is a cell having a highest signal strength among the at least one neighboring cell,
      configures a cooperation-based cell cluster with information on the anchor cell and the determined supporting neighboring cell,
      performs cooperative communication between the anchor cell and the determined supporting neighboring cell based on the cooperation-based cell cluster when the signal strength of the anchor cell is a sum of a signal strength of the determined supporting neighboring cell and a first cooperation threshold or less, during performing the cooperative communication between the anchor cell and the determined supporting neighboring cell, controls the transceiver to receive information on a signal strength of at least one anchor cell candidate, wherein the at least one anchor cell candidate is at least one cell adjacent to the determined supporting neighboring cell and is not adjacent to the anchor cell, and performs a handover from the anchor cell to a specific anchor cell candidate when the signal strength of the specific anchor cell candidate is a sum of the signal strength of the anchor cell and a handover threshold or greater, wherein the specific anchor cell candidate is a cell having the highest signal strength among the at least one anchor cell candidate, wherein the information on signal strength is at least one of a Received Signal Strength Indicator (RSSI), Reference Signal Received Power (RSRP) or Reference Signal Received Quality (RSRQ), and wherein the anchor cell is unchanged in the cooperative communication, and the anchor cell is changed to the specific anchor cell candidate in the handover.

* * * * *